(12) United States Patent
Haller

(10) Patent No.: US 7,911,758 B2
(45) Date of Patent: Mar. 22, 2011

(54) LOW POWER SOLENOID CONTROL SYSTEM AND METHOD

(75) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 358 days.

(21) Appl. No.: 12/119,546

(22) Filed: May 13, 2008

(65) Prior Publication Data

US 2009/0284891 A1     Nov. 19, 2009

(51) Int. Cl.
*H01H 9/00* (2006.01)
*H01H 47/00* (2006.01)
*H02H 3/08* (2006.01)
*H02H 9/02* (2006.01)

(52) U.S. Cl. ............ 361/189; 361/93.1; 361/93.7
(58) Field of Classification Search .......... 361/160, 361/189
See application file for complete search history.

(56) References Cited

U.S. PATENT DOCUMENTS

| | | | |
|---|---|---|---|
| 4,220,872 A * | 9/1980 | Fahey | 307/32 |
| 4,839,754 A | 6/1989 | Gami et al. | |
| 5,532,526 A | 7/1996 | Ricco et al. | |
| 5,717,562 A | 2/1998 | Antone et al. | |
| 5,930,104 A * | 7/1999 | Kadah et al. | 361/187 |
| 6,646,851 B1 | 11/2003 | Gudat | |
| 2003/0123211 A1 | 7/2003 | Newton et al. | |
| 2005/0047053 A1 | 3/2005 | Meyer et al. | |
| 2005/0248902 A1 | 11/2005 | Kotwicki | |

FOREIGN PATENT DOCUMENTS

| | | |
|---|---|---|
| DE | 19701471 | 7/1998 |
| DE | 19808780 | 9/1999 |
| FR | 2779287 | 12/1999 |
| WO | 2005014992 | 2/2005 |
| WO | 2005093239 | 10/2005 |

OTHER PUBLICATIONS

Michael Lund, International Search Report for International Patent Application No. PCT/US2009/038118, European Patent Office, dated Jun. 18, 2009.
Michael Lund, Written Opinion for International Patent Application No. PCT/US2009/038118, European Patent Office, dated Jun. 18, 2009.

* cited by examiner

*Primary Examiner* — Dharti H Patel
(74) *Attorney, Agent, or Firm* — Locke Lord Bissell & Liddell LLP

(57) ABSTRACT

A low power solenoid control circuit including a power source in series with a sensing element and a first diode, an inductor to actuate a valve, an energy storage device to store and discharge energy into the inductor, diodes to control current flow, and switches and a controller to control the circuit. The circuit may be operated by closing a first switch, thereby allowing a source current to flow through an inductor; opening the first switch, thereby forcing a charge current to flow through an energy storage device utilizing the inductance of the inductor; repeating these steps until the energy storage device is sufficiently charged; and upon command, closing a second switch, thereby forcing a discharge current to flow from the energy storage device to the inductor causing the inductor to produce an actuating magnetic field thereby actuating a mechanical valve.

32 Claims, 1 Drawing Sheet

LOW POWER SOLENOID CONTROL SYSTEM AND METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to control systems; and more specifically relate to low power control systems.

2. Description of the Related Art

U.S. Pat. No. 5,532,526 teaches "[a] control circuit for supplying a load with current having a high-amplitude portion with a rapid leading edge, and a lower-amplitude portion. The circuit is input-connected to a low-voltage supply source, and comprises a number of actuator circuits parallel-connected between the input terminals and each including a capacitor and a load. Each actuator circuit also comprises a first controlled switch between the respective load and a reference line, for enabling energy supply and storage by the respective load. A second controlled switch is provided between the capacitor line and the load line, for rapidly discharging the capacitors into the load selected by the first switch and recirculating the load current, or for charging the capacitors with the recirculated load current."

U.S. Pat. No. 6,646,851 teaches "[a] circuit arrangement for operating a solenoid actuator, for example, an electric motor provided in the form of a switched reluctance motor, permits operation of the motor in the event of malfunction or failure of part of an energy supply. The circuit arrangement advantageously includes an auxiliary battery serving as a redundance in addition to a main battery. The auxiliary battery is smaller and has a lower nominal voltage than the main battery. In order to permit continued operation of the electric motor in the event of failure, with a nominal operating voltage which is adapted to the nominal voltage of the main battery, a capacitor which can be switched on and off is connected in series to the batteries. An energy quantity can be accumulated in the capacitor by switching the current switching through an exciter winding of the electric motor in the manner of a switching regulator, whereby the nominal voltage of the capacitor finally exceeds the voltage in the auxiliary battery. When a sufficient quantity of energy has been accumulated, the electric motor can be actuated for a short time by means of the energy accumulated in the capacitor. Electrically actuated braking systems in commercial vehicles represent a significant and preferred area of application for the invention."

The inventions disclosed and taught herein are directed to an improved system and method for controlling a solenoid in low power applications.

BRIEF SUMMARY OF THE INVENTION

A low power solenoid control circuit including a power source in series with a sensing element and a first diode, an inductor to actuate a valve, an energy storage device to store and discharge energy into the inductor, diodes to control current flow, and switches and a controller to control the circuit.

The circuit may be operated by closing a first switch, thereby allowing a source current to flow through an inductor; opening the first switch, thereby forcing a charge current to flow through an energy storage device utilizing the inductance of the inductor; repeating these steps until the energy storage device is sufficiently charged; and upon command, closing a second switch, thereby forcing a discharge current to flow from the energy storage device to the inductor causing the inductor to actuate a mechanical valve.

DETAILED DESCRIPTION

Figure 1:
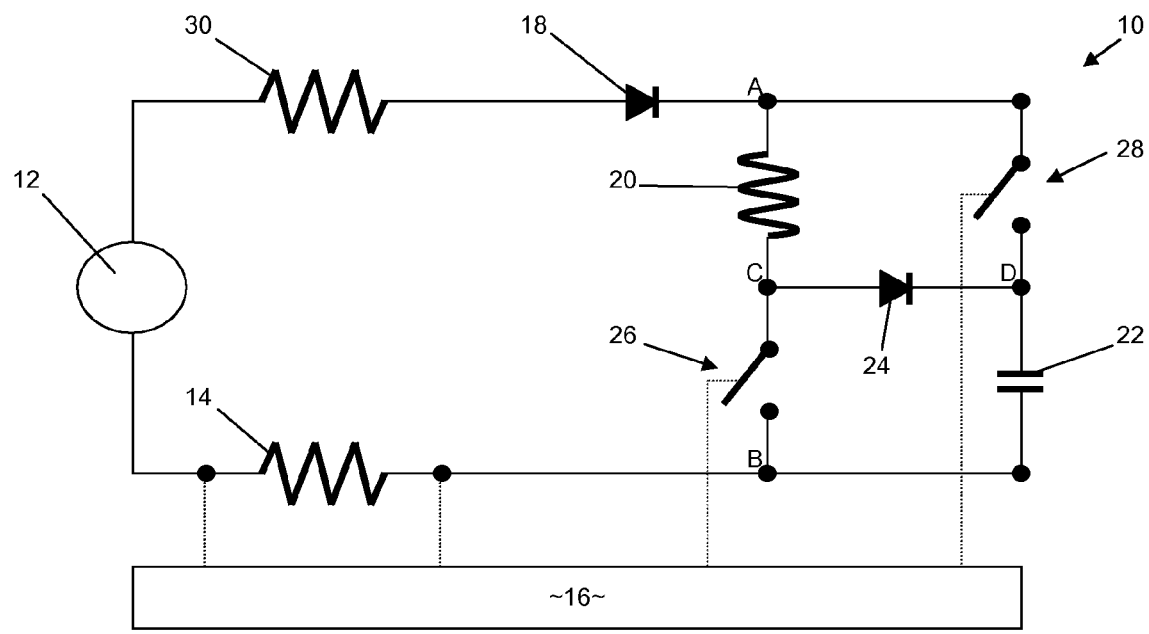
FIG. 1 illustrates a particular embodiment of a low power solenoid control circuit utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Applicants have created a low power solenoid control circuit including a power source in series with a sensing element and a first diode between nodes, an inductor to actuate a valve, an energy storage device to store and discharge energy into the inductor, diodes to control current flow, and switches and a controller to control the circuit.

The circuit may be operated by closing a first switch, thereby allowing a source current to flow through an inductor; opening the first switch, thereby forcing a charge current to flow through an energy storage device utilizing the inductance of the inductor; repeating these steps until the energy storage device is sufficiently charged; and upon command, closing a second switch, thereby forcing a discharge current to flow from the energy storage device to the inductor causing the inductor to actuate a mechanical valve.

FIG. 1 is an illustration of a first preferred embodiment of a low power solenoid control circuit 10 showing certain aspects of the present inventions. The circuit 10 is preferably incorporated into a solenoid valve of the type commonly used in connection with pneumatic and/or hydraulic industrial control systems. The circuit 10 preferably incorporates a three wire connection to an external supervisory control system, such as a distributed control system (DCS) or a programmable logic controller (PLC). The three wire connection preferably includes a power connection and a control connection, both referenced to a ground or neutral connection. The power connection is preferably a direct current (DC) voltage of approximately twelve or twenty-four volts. Other voltages may be accommodated, depending on actual implementation. The control connection may be incorporated into the power connection, thereby requiring only a two wire connection to the supervisory control system.

The circuit 10 preferably includes a power source 12. The power source 12 is preferably DC as provided through the two or three wire connection. The power source 12 may be independent of the two or three wire connection or may simply be embodied by the two or three wire connection.

The circuit 10 also preferably includes a sensing element 14 in series with the power source 12. In one embodiment, the sensing element 14 is a precision shunt resistor through which current can be calculated by measuring voltage across the shunt. However, the sensing element 14 may take other forms, such as an inductive current sensor, a hall-effect current sensor, another current sensing device, a voltage sensing device, or a power sensing device. The sensing element 14 may also be incorporated into other components of the circuit 10. The sensing element 14 is implemented to sense or otherwise measure the current or power being delivered through the power source 12.

In any case, the circuit 10 preferably includes a controller 16 that monitors the sensing element 14. The controller 16 preferably comprises a programmable microcontroller, such as the Microchip PIC16F631. However, the controller 16 may alternatively be implemented in hardwired logic. In any case, the controller 16 preferably monitors the sensing element 14 in order to determine the current, voltage, and/or power applied thereto. The controller 16 then manipulates or otherwise operates other components of the circuit 10 based at least in part on the input from the sensing element 14, as will be discussed in greater detail below.

The circuit 10 also preferably includes a first diode 18 in series with the power source 12 and the sensing element 14. The first diode 18 is preferably rated to accommodate and protect the power source 12. For example, when forward biased, the first diode 18 is preferably rated to pass the current the power source 12 is expected to provide under normal and acceptable abnormal conditions. When reverse biased, the first diode 18 is preferably rated to block any expected discharge current, which will be discussed in greater detail below. Where the controller 16 is more capable, the first diode 18 can be replaced by a switch controlled by the controller 16. For example, the controller 16 may monitor both current amplitude and direction through the sensing element 14 and open a switch used in place of the first diode 18, when the first diode 18 would normally be reverse biased or otherwise prevent current flow.

The circuit 10 also preferably includes a solenoid coil 20, or some other inductor. In the preferred embodiment, the coil 20 is operable to actuate a mechanical valve, such as a pneumatic and/or hydraulic control valve. The mechanical valve then preferably manipulates or otherwise controls a process control valve. However, in some implementations, the coil 20 may be configured to actuate the process control valve directly.

The inductor, or coil, 20 produces a magnetic field, which is proportional to the current that flows therethrough. The field is used to linearly displace a plunger, or other mechanical element, in order to actuate the valve. One will appreciate that the field must be of sufficient strength, in order to move the plunger and thereby actuate the valve. One with ordinary skill in the art will appreciate that there are a number of ways to increase the field strength for a given current. For example, one may choose to increase the turn density of the coil 20. However, there are often practical limitations, especially in certain low power applications, such that the available current is simply insufficient to produce a strong enough field to actuate the valve.

Therefore, the circuit 10 of the present inventions preferably include an energy storage device 22, such as a capacitor, to accumulate energy from the available current and discharge that stored energy into the coil 20. Because this discharge current can be significantly greater than a source current, from which it was created, a controlled discharge is capable of creating a sufficient field to actuate the valve. The capacitor 22 can be charged directly from the source current, produced by the power source 12. However, because the discharge current is expected to need to be greater than the source current, in order to actuate the valve, the energy storage device 22 is also preferably operable to be charged by a charge current induced by the inductor 20, as will be discussed in greater detail below.

In order to prevent premature discharge of the energy storage device 22, the circuit 10 preferably includes a second diode 24 configured to retain the charge on the capacitor 22.

The second diode 24 is preferably rated to pass the source current, when forward biased, and block the energy stored in the energy storage device 22, when reverse biased. As with the first diode 18, the second diode 24 may be replaced with a switch controlled by the controller 16. However, this may require the controller 16 to have additional inputs and/or be more predictive in operation, in order to control the charge on the capacitor 22.

To control the source current, the charge current, and the discharge current, as well as other aspects of the inventions, the circuit 10 also preferably includes first and second switches 26,28. The first and second switches 26,28 are preferably single pole single throw (SPST) switches. The first and second switches 26,28 may be mechanical switches or may be solid state devices, such as transistors or more specifically MOSFETs. For example, the first switch 26 and/or the second switch 28 may be a normally closed depletion mode MOSFET, or similar device.

The first and second switches 26,28 are preferably controlled by the controller 16, as will be discussed in more detail below. For example, the first switch 26 is preferably primarily used to control the source current in such a way as to induce the charge current using the inductor 20. The second switch 28 is preferably primarily used to control the discharge current into the coil 20, thereby actuating the valve on command from the supervisory control system.

The circuit 10 may also include a current limiting device 30, such as a limiting resistor, in series with the power source 12 to further protect the components of the circuit 10. Alternatively, the current limiting device 30 may be incorporated into other components of the circuit 10. For example, the shunt resistor 14 may be sized to serve both as the sensing element 14 and the current limiting device 30.

Other and further embodiments utilizing one or more aspects of the inventions described above can be devised without departing from the spirit of Applicant's invention. For example, as discussed above, the diodes 18,24 may be replaced with controlled switches, which may be embodied by transistors, such as MOSFETs. Further, the various methods and embodiments of the present invention can be included in combination with each other to produce variations of the disclosed methods and embodiments. Additionally, the embodiments described above may be improved and/or further enhanced. In some instances, discussion of singular elements can include plural elements and vice-versa. However, the embodiment described above is preferable in that the minimal components described work together to reduce size, cost, and manufacturing complexity.

Figure 2:
FIG. 2 is a timing diagram showing certain functionality of the present inventions.

Now referring additionally to FIG. 2, in use, the circuit 10 successively charges the energy storage device 22 until sufficient energy is stored therein. Upon command, the energy stored in the energy storage device 22 is discharged into the inductor 20 thereby generating a magnetic field sufficient to actuate the valve. It can be seen that the source current is otherwise insufficient to generate a sufficient magnetic field without the teachings of the present invention.

In more detail, let us begin by assuming that the capacitor 22 has been fully discharged and therefore no longer stores significant energy and that both switches 26,28 are open, as shown in FIG. 1. The first switch 26 is closed at time T1, thereby allowing the supply current to flow through the coil 20. When the supply current reaches a first predetermined level, at T2, the first switch 26 is opened. The inductor 20 therefore forces the supply current to forward bias the second diode 24 inducing the charge current through the capacitor 22. When the supply current subsides to a second predetermined level, at T3, the first switch 26 is closed again, and the cycle is repeated. When the first switch 26 is closed, the second diode 24 is reversed biased, thereby preventing the capacitor 22 from discharging. Therefore, each time the cycle is repeated, the energy in the capacitor 22 increases.

As shown in FIG. 2, the cycles may be initiated with the capacitor 22 fully discharged. Alternatively, the capacitor 22 may be directly from the supply current by temporarily closing the second switch 28. This would start the stored energy level at the point shown at T3, versus T1.

During manufacturing of the solenoid valve, of which the circuit 10 is preferably a part, the number of charging cycles that are required can be determined. More specifically, due to variances in the components of the circuit 10 and/or other variables, such as ambient operating temperature, it is expected that a different number of cycles may be required for different circuits 10 and/or different valves before the energy storage device 22 has accumulated sufficient energy to reliably actuate the valve. Therefore, once the circuit 10 is assembled, a calibration process can be conducted to determine how many cycles will be required for a given implementation. The necessary number of cycles is preferably programmed, or otherwise configured, into the controller 16. In the example shown in FIG. 2, this predetermined number of cycles is three. Therefore, at T7, the energy storage device 22 has stored sufficient energy to induce sufficient magnetic field in the inductor 20, in order to actuate the valve.

At this point, the energy storage device 22 is fully charged and ready to supply a discharge current to the inductor 20, and thereby actuate the valve. The controller 16 may maintain the first switch 26 in the open position. One advantage of this approach is an energy savings in low power applications, and is especially helpful where the valve is infrequently actuated. Alternatively, the controller 16 may close the first switch 26, thereby allowing the supply current flow through the inductor 20. One advantage of this approach is that there is some field already present in the inductor 20, when the energy storage device 22 discharges.

At T8, the controller 16 receives a control input, through the control connection from the external supervisory control system. The controller 16 immediately closes both switches 26,28, thereby releasing the energy stored in the energy storage device 22. This discharge current from the capacitor 22 reverse biases both diodes 18,24 and flows through the inductor 20. The surge of energy causes the coil 20 to generate a magnetic field sufficient to actuate the valve.

It can be seen that as we approach T9, the energy stored in the capacitor 22 is dissipated. Once the voltage associated with that energy falls below the supply voltage, of the power supply 12, the first diode 18 becomes forward biased, thereby allowing the supply current to begin building once again. When the controller 16 begins to detect the supply current rising, the controller preferably opens the second switch 28.

At this point, the controller 16 may begin the cycles of opening and closing the first switch 26, as discussed above, to recharge the capacitor 22. This will ensure the energy storage device 22 is capable of re-actuating the valve, if that should be necessary. This may prove especially advantageous where the valve is frequently actuated and/or where the valve is susceptible to inadvertently dropping out.

It is possible for the relatively high discharge current to induce so much energy in the inductor 20, that the power supply 12 could become overloaded. In order to prevent such an overload, the controller 16 may leave the second switch 28 closed and begin cycling the first switch 26 instead. More specifically, after closing both switches 26,28 and thereby discharging the capacitor 22, the controller 16 may open the first switch 26 when the sensed current through the sensing element 14 begins to approach the power supply's 12 current limit. The controller 16 preferably waits a predetermined fixed time, allowing the current to fall off, before closing the first switch 26 again. This fixed time may be calculated based on the resistance, inductance, and/or capacitance of the circuit 10 or may be determined during the calibration process. This cycle can be repeated until the energy in the inductor 20 is bled off and/or the capacitor 22 is recharged.

This allows the controller 16 to function as a current regulator by controlling the duty cycle of the first switch 26 based on input from the sensing element 14. Such functionality may allow higher currents through the coil 20, as may be desirable in certain applications.

The controller 16 may be more advanced that that described above. For example, the controller 16 may control and/or measure the source current waveform shown in FIG. 2. From this, the controller 16 may infer the voltage applied to the circuit 10 by the power supply 12, based in part on the switching times of the switches 26,28.

Furthermore, it can be appreciated that the plunger of the solenoid valve may be subject to mechanical shock. In the valve has been actuated, and is subject to mechanical shock, such shock may cause the valve to drop out, inadvertently closing and/or opening the valve depending on the valve construction. However, as the plunger moves with respect to the coil 20, it will likely induce a current spike in the inductor 20. This spike may be reflected in the source current waveform monitored by the controller 16. Any such pattern could be observed and stored within the controller 16. This could be recorded as part of the calibration process discussed above. Thereafter, the controller 16 may continuously, or periodically, compare the source current to this pre-observed pattern, in order to detect when and if the solenoid valve has dropped out, or inadvertently actuated. If the controller 16 detects an inadvertent drop out or actuation, the controller 16 may take immediate corrective measures, without waiting for input from the external supervisory control system. For example, if the controller 16 has actuated the valve and detects an inadvertent drop out, the controller 16 may immediately re-actuate the valve.

Alternatively, or additionally, the controller 16 may inform the supervisory control system, through a two-way communications link, or operator, by sounding an alarm. This may be accomplished using a separate output or by overriding the control input. This would allow the supervisory control system or operator to take corrective or preventative measures, as needed. The controller 16, or supervisory control system, may also log such occurrences and thereby determine if the solenoid valve needs to be replaced and/or if the power supply 12 is inadequate.

In some implementations, the order of steps can occur in a variety of sequences, unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method comprising the steps of:
   (a) closing a single first switch, thereby allowing a source current to flow through an inductor;
   (b) opening the single first switch, thereby forcing a charge current to flow through an energy storage device utilizing the inductance of the inductor;
   (c) repeating steps a and b until the energy storage device is sufficiently charged, wherein steps a and b are performed a predetermined number of times and the predetermined number of times is determined through a calibration process performed upon circuit assembly during manufacturing;
   (d) upon command, closing a second switch, thereby forcing a discharge current to flow from the energy storage device to the inductor causing the inductor to produce an actuating magnetic field thereby actuating a mechanical valve.

2. The method of claim 1, wherein the source current is insufficient to actuate the valve.

3. The method of claim 1, wherein step a is maintained until the source current reaches a first predetermined level as measured through a current sensing element.

4. The method of claim 3, wherein step b is maintained until the source current reaches a second predetermined level as measured through the current sensing element.

5. The method of claim 1, wherein the calibration process accounts for both component tolerances and ambient temperature.

6. The method of claim 1, wherein steps a and b are performed with the second switch open.

7. The method of claim 1, further including the steps of:
   (e) after the valve has been actuated, monitoring the source current through a current sensing element; and
   (f) once the source current reaches a predetermined level, repeating steps a and b to recharge the energy storage device.

8. The method of claim 1, wherein the first switch is a normally closed depletion mode MOSFET.

9. The method of claim 1, wherein the first SPST switch is a normally closed depletion mode MOSFET.

10. The method of claim 1, wherein steps a, b, and c further comprise:
    maintaining the first SPST switch closed until the source current rises to a first predetermined level;
    opening the first SPST switch when the source current rises to the first predetermined level; and
    closing the first SPST switch once the source current falls to a second predetermined level.

11. A method comprising the steps of:
    (a) opening a first single pole single throw (SPST) switch and closing a second SPST switch, thereby forward biasing a first diode, allowing a source current to flow through a capacitor charging the capacitor;
    (b) opening the second SPST switch, thereby reverse biasing a second diode and maintaining the charge of the capacitor;
    (c) closing the first SPST switch, thereby allowing the source current to flow through a solenoid coil;
    (d) opening the first SPST switch, thereby forward biasing the second diode and forcing a charge current to flow through the capacitor utilizing the inductance of the solenoid coil;

(e) repeating steps c and d until the capacitor is sufficiently charged;
(f) upon command, closing both the first and second SPST switches, thereby reverse biasing both the first and second diodes and forcing a discharge current to flow from the capacitor to the solenoid coil causing the solenoid coil to produce an actuating magnetic field thereby actuating a mechanical valve,
wherein step c is maintained until the source current reaches a first predetermined level as measured through a current sensing element.

12. The method of claim 11, wherein the source current is insufficient to produce the actuating magnetic field to the actuate the valve.

13. The method of claim 11, wherein step d is maintained until the source current reaches a second predetermined level as measured through the current sensing element.

14. The method of claim 11, wherein steps c and d are performed a predetermined number of times.

15. The method of claim 14, the predetermined number of times is determined through a calibration process and accounts for both component tolerances and ambient temperature.

16. The method of claim 11, wherein steps c and d are performed with the second SPST switch open.

17. The method of claim 11, further including the steps of:
(g) after the valve has been actuated, monitoring the source current through a current sensing element; and
(h) once the source current reaches a predetermined level, repeating steps a and b to recharge the energy storage device.

18. The method of claim 11, wherein steps a, b, c, d, and e further comprise:
maintaining the first SPST switch closed until the source current rises to a first predetermined level;
opening the first SPST switch when the source current rises to the first predetermined level; and
closing the first SPST switch once the source current falls to a second predetermined level.

19. A method comprising the steps of:
(a) opening a first single pole single throw (SPST) switch and closing a second SPST switch, thereby forward biasing a first diode, allowing a source current to flow through a capacitor charging the capacitor;
(b) opening the second SPST switch, thereby reverse biasing a second diode and maintaining the charge of the capacitor;
(c) closing the first SPST switch, thereby allowing the source current to flow through a solenoid coil;
(d) opening the first SPST switch, thereby forward biasing the second diode and forcing a charge current to flow through the capacitor utilizing the inductance of the solenoid coil;
(e) repeating steps c and d until the capacitor is sufficiently charged;
(f) upon command, closing both the first and second SPST switches, thereby reverse biasing both the first and second diodes and forcing a discharge current to flow from the capacitor to the solenoid coil causing the solenoid coil to produce an actuating magnetic field thereby actuating a mechanical valve,
wherein steps c and d are performed a predetermined number of times determined through a calibration process and accounts for both component tolerances and ambient temperature.

20. The method of claim 19, wherein the source current is insufficient to produce the actuating magnetic field to the actuate the valve.

21. The method of claim 19, wherein steps c and d are performed with the second SPST switch open.

22. The method of claim 19, further including the steps of:
(e) after the valve has been actuated, monitoring the source current through a current sensing element; and
(f) once the source current reaches a predetermined level, repeating steps a and b to recharge the energy storage device.

23. The method of claim 19, wherein steps a, b, c, d, and e further comprise:
maintaining the first SPST switch closed until the source current rises to a first predetermined level;
opening the first SPST switch when the source current rises to the first predetermined level; and
closing the first SPST switch once the source current falls to a second predetermined level.

24. A method comprising the steps of:
(a) opening a first single pole single throw (SPST) switch and closing a second SPST switch, thereby forward biasing a first diode, allowing a source current to flow through a capacitor charging the capacitor;
(b) opening the second SPST switch, thereby reverse biasing a second diode and maintaining the charge of the capacitor;
(c) closing the first SPST switch, thereby allowing the source current to flow through a solenoid coil;
(d) opening the first SPST switch, thereby forward biasing the second diode and forcing a charge current to flow through the capacitor utilizing the inductance of the solenoid coil;
(e) repeating steps c and d until the capacitor is sufficiently charged;
(f) upon command, closing both the first and second SPST switches, thereby reverse biasing both the first and second diodes and forcing a discharge current to flow from the capacitor to the solenoid coil causing the solenoid coil to produce an actuating magnetic field thereby actuating a mechanical valve;
(g) after the valve has been actuated, monitoring the source current through a current sensing element; and
(h) once the source current reaches a predetermined level, repeating steps a and b to recharge the energy storage device.

25. The method of claim 24, wherein the source current is insufficient to produce the actuating magnetic field to the actuate the valve.

26. The method of claim 24, wherein steps c and d are performed a predetermined number of times.

27. The method of claim 24, wherein steps c and d are performed with the second SPST switch open.

28. The method of claim 24, wherein steps a, b, c, d, and e further comprise:
maintaining the first SPST switch closed until the source current rises to a first predetermined level;
opening the first SPST switch when the source current rises to the first predetermined level; and
closing the first SPST switch once the source current falls to a second predetermined level.

29. A method comprising the steps of:
(a) opening a first single pole single throw (SPST) switch and closing a second SPST switch, thereby forward biasing a first diode, allowing a source current to flow through a capacitor charging the capacitor;

(b) opening the second SPST switch, thereby reverse biasing a second diode and maintaining the charge of the capacitor;
(c) closing the first SPST switch, thereby allowing the source current to flow through a solenoid coil;
(d) opening the first SPST switch, thereby forward biasing the second diode and forcing a charge current to flow through the capacitor utilizing the inductance of the solenoid coil;
(e) repeating steps c and d until the capacitor is sufficiently charged;
(f) upon command, closing both the first and second SPST switches, thereby reverse biasing both the first and second diodes and forcing a discharge current to flow from the capacitor to the solenoid coil causing the solenoid coil to produce an actuating magnetic field thereby actuating a mechanical valve, wherein steps a, b, c, d, and e further comprise:
maintaining the first SPST switch closed until the source current rises to a first predetermined level;
opening the first SPST switch when the source current rises to the first predetermined level; and
closing the first SPST switch once the source current falls to a second predetermined level.

30. The method of claim 29, wherein the source current is insufficient to produce the actuating magnetic field to actuate the valve.

31. The method of claim 29, wherein steps c and d are performed a predetermined number of times.

32. The method of claim 29, wherein steps c and d are performed with the second SPST switch open.

* * * * *